(12) United States Patent
Tertinek

(10) Patent No.: US 11,774,576 B2
(45) Date of Patent: Oct. 3, 2023

(54) PHASE-BASED RANGING

(71) Applicant: NXP B.V., Eindhoven (NL)

(72) Inventor: Stefan Tertinek, Graz (AT)

(73) Assignee: NXP B.V., Eindhoven (NL)

( * ) Notice: Subject to any disclaimer, the term of this patent is extended or adjusted under 35 U.S.C. 154(b) by 228 days.

(21) Appl. No.: 17/121,684

(22) Filed: Dec. 14, 2020

(65) Prior Publication Data
US 2021/0239826 A1    Aug. 5, 2021

(30) Foreign Application Priority Data

Jan. 31, 2020    (EP) .................................... 20154970

(51) Int. Cl.
*G01S 13/84*    (2006.01)
*H04B 1/38*    (2015.01)

(52) U.S. Cl.
CPC ................ *G01S 13/84* (2013.01); *H04B 1/38* (2013.01)

(58) Field of Classification Search
CPC ........ G01S 13/84; G01S 13/103; G01S 11/02; G01S 13/36; G01S 19/235; G01S 5/0289; G01S 19/35; G01S 3/48; H04B 1/38; H04B 17/27; H04L 2027/0026; H04L 2027/0067

See application file for complete search history.

(56) References Cited

U.S. PATENT DOCUMENTS

| | | | |
|---|---|---|---|
| 6,859,761 | B2 | 2/2005 | Bensky et al. |
| 9,584,139 | B2 | 2/2017 | Wicpalek et al. |
| 2002/0094786 | A1 | 7/2002 | Berliner et al. |
| 2014/0270032 | A1 | 9/2014 | Liu et al. |

(Continued)

FOREIGN PATENT DOCUMENTS

WO    2019066835 A1    4/2019

OTHER PUBLICATIONS

Zand et al., "A high-accuracy phase-based ranging solution with Bluetooth Low Energy (BLE)", IEEE WCNC 2019, 8 pages.

*Primary Examiner* — Timothy A Brainard
*Assistant Examiner* — Juliana Cross

(57) ABSTRACT

The disclosure relates to determining a carrier phase shift between a first transceiver and a second transceiver, each transceiver comprising a local oscillator for generating a carrier signal, an example method for which comprises: the first transceiver generating and transmitting a first continuous wave carrier signal packet; the second transceiver receiving the first continuous wave carrier signal packet; the second transceiver calculating a first phase correction based on a comparison between the received first continuous wave carrier signal packet and a local oscillator carrier signal at the second transceiver; the second transceiver generating and transmitting a second continuous wave carrier signal packet; the first transceiver receiving the second continuous wave carrier signal packet; the first transceiver calculating a second phase correction based on a comparison between the received second continuous wave carrier signal packet and a local oscillator signal at the first transceiver; and the first transceiver calculating the carrier phase shift from an average of the first and second phase corrections, wherein the local oscillator of the first transceiver is deactivated after transmitting the first continuous wave carrier signal packet and reactivated before receiving the second continuous wave carrier signal packet.

10 Claims, 4 Drawing Sheets

(56) References Cited

U.S. PATENT DOCUMENTS

| | | | |
|---|---|---|---|
| 2014/0321586 A1* | 10/2014 | Lee | H03J 1/005 375/362 |
| 2015/0103872 A1* | 4/2015 | Tarighat Mehrabani | H04L 27/00 375/375 |
| 2015/0346332 A1* | 12/2015 | Taylor, Jr. | G01S 13/84 342/458 |

* cited by examiner

PHASE-BASED RANGING

FIELD

The disclosure relates to methods and apparatus for determining a distance between radio transceivers using phase change measurement.

BACKGROUND

Determining the location of a radio transceiver, known as localization, enables services that use the location of the transceiver to provide contextual information. A location may, for example, be determined worldwide by use of satellite navigation signals through GNSS. For transceivers with low power and/or low cost requirements, however, this may not be available. Other techniques for location sensing then need to be used.

The location of a radio transmitter can be determined by triangulation. In a two-dimensional plane, a precise location of a transmitter can be determined by measuring the distance between the transmitter and three separate receivers at different positions in the plane. This may, for example, be used in mobile telecommunications networks by triangulation using multiple base station transceivers detecting a radio signal from a mobile telephone, enabling location measurements on a scale of kilometres to hundreds of metres.

At smaller scales of around 100 m or less, devices may be equipped with a short range wireless technology such as Bluetooth to enable high speed wireless communication and control. To enable contextual services at these scales, a method of determining the location of a Bluetooth device relative to other devices may be made using triangulation. To do this, measures of distances between pairs of transceivers may be used to build up a location of a device.

Measuring a distance may be made using the strength of a received signal, given that the strength of a radio signal will vary as a function of the inverse square of the distance. This depends, however, on knowing the initial strength of the signal and is strongly affected by the medium through which the signal passes. Such measurements are therefore inherently unreliable.

An alternative technique for determining location is to measure an angle of arrival of a signal, which can then be used for triangulation. This, however, requires multiple antennae to be able to measure a phase difference between signals received at separate locations.

Another alternative technique is to measure the time of flight of a signal. For short distances, however, the accuracy required for this is very high. To measure to an accuracy of 0.5 m, a resolution of 1.6 ns is required, which may be beyond the capability of small low power transceivers.

Phase-based measurements may be used to measure distance by estimating the phase rotations induced by propagation of a signal. This is a more practical option for low power transceivers because it requires only the generation of continuous wave (CW) signals at different frequencies. A problem, however, is the need to generate the required CW signals, which require the use of a local oscillator (LO) with a phase-locked loop (PLL). For low power devices, the generation of such CW signals may have a significant impact on power consumed, and therefore on battery life.

SUMMARY

In accordance with a first aspect, there is provided a method of determining a carrier phase shift between a first transceiver and a second transceiver, each transceiver comprising a local oscillator for generating a carrier signal, the method comprising:

the first transceiver generating and transmitting a first continuous wave carrier signal packet;

the second transceiver receiving the first continuous wave carrier signal packet;

the second transceiver calculating a first phase correction based on a comparison between the received first continuous wave carrier signal packet and a local oscillator carrier signal at the second transceiver;

the second transceiver generating and transmitting a second continuous wave carrier signal packet;

the first transceiver receiving the second continuous wave carrier signal packet;

the first transceiver calculating a second phase correction based on a comparison between the received second continuous wave carrier signal packet and a local oscillator signal at the first transceiver; and the first transceiver calculating the carrier phase shift from an average of the first and second phase corrections, wherein the local oscillator of the first transceiver is deactivated after transmitting the first continuous wave carrier signal packet and reactivated before receiving the second continuous wave carrier signal packet.

An advantage of the above defined method is that the first transceiver saves power by deactivating the local oscillator between sending and receiving signals.

A phase tracking module in the first transceiver may be used to maintain phase coherence of the local oscillator when reactivated. The phase tracking module may track the phase of the local oscillator before the local oscillator is deactivated, determine a phase value upon deactivation and cause the local oscillator to settle to a phase value dependent on the determined phase value after the local oscillator is reactivated.

The first transceiver may comprise a time to digital converter configured to provide a measure of phase difference between a reference clock signal and the local oscillator signal after reactivation, the second phase correction including the measured phase difference.

The local oscillator of the first transceiver may be deactivated for up to around 190 µs between transmitting the first continuous wave carrier signal packet and receiving the second continuous wave carrier signal packet.

The first and second transceivers may be configured to operate as Bluetooth transceivers, operating at a frequency range of between 2.4 and 2.4835 GHz.

In accordance with a second aspect, there is provided a method of determining a distance between first and second transceivers, comprising:

performing the method according to the first aspect with the first and second continuous wave carrier signal packets at a plurality of different frequencies; and calculating the distance between the first and second transceivers from carrier phase shifts determined at each of the plurality of different frequencies.

In accordance with a third aspect there is provided a first transceiver comprising:

a transmitter;

a receiver;

a switch arranged to selectively switch the transceiver between transmitting and receiving signals via a common antenna;

a reference clock signal generator;

a local oscillator configured to generate a carrier signal from a clock signal provided by the reference clock signal generator; and a phase tracking module arranged to maintain phase coherence of the local oscillator upon reactivating the local oscillator after deactivation, wherein the transceiver is configured to determine a carrier phase shift of signals sent between the first transceiver and a second transceiver by the sequential steps of:

i) generating and transmitting a first continuous wave carrier signal packet;
ii) deactivating the local oscillator;
iii) reactivating the local oscillator;
iii) receiving a second continuous wave carrier signal packet transmitted by the second transceiver;
iv) calculating a second phase correction based on a comparison between the received second continuous wave carrier signal packet and a local oscillator signal at the first transceiver; and
v) receiving a first phase correction from the second transceiver based on a comparison between the first continuous wave carrier signal packet and a local oscillator carrier signal at the second transceiver; and
vi) calculating the carrier phase shift from an average of the first and second phase corrections.

The phase tracking module may be configured to track the phase of the local oscillator signal before the local oscillator is deactivated, determine a phase value upon deactivation and cause the local oscillator to settle to a phase value dependent on the determined phase value after the local oscillator is reactivated.

The first transceiver may comprise a time to digital converter configured to provide a measure of phase difference between a reference clock signal and the local oscillator signal after reactivation of the local oscillator, the second phase correction including the measured phase difference.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
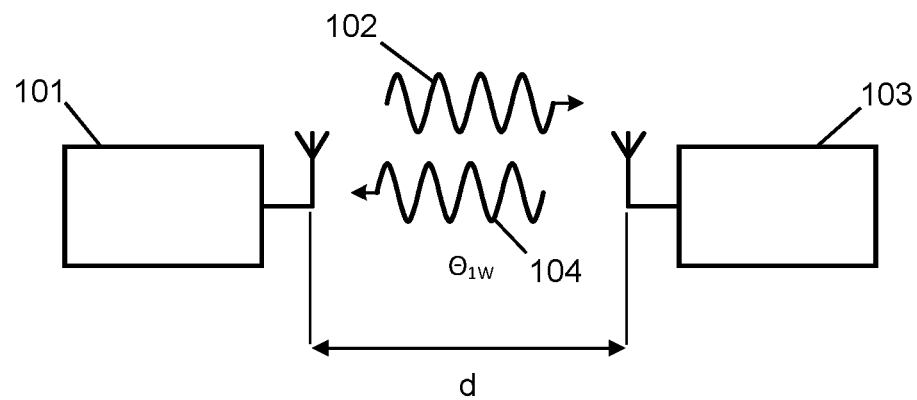
FIG. 1 is a schematic diagram illustrating the principle of phase-based ranging between transceivers.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

A current draft proposal by the Bluetooth core specification working group (High-Accuracy Distance Measurement, Bluetooth® Draft Improvement Proposal Document (DIPD), Revision: r04, Revised 14 Jul. 2019) describes a phase-based ranging technique in which local oscillators in a pair of transceivers, termed an initiator and a reflector, are configured to run continuously during a distance measurement process. This is schematically illustrated in FIG. 1, where the initiator 101, or first transceiver, transmits a first CW signal packet 102 and a reflector 103, or second transceiver, transmits a second CW signal packet 104. A phase shift $\theta_{1W}$ is induced by the distanced between the transceivers 101, 103. By repeating this process on a number of different frequencies, the distance d can be calculated from the phase shifts at different frequencies.

According to the above mentioned proposal, the local oscillators in the initiator 101 and reflector 103 are required to run continuously because any change in the LO phase will contribute to the phase measurement uncertainty. The oscillators are, in other words, required to exhibit phase coherence throughout the measurement process. A disadvantage of this approach is that the LO circuits in each of the initiator 101 and reflector 103, in particular the phase-locked loop (PLL) and the LO dividers and buffers, need to remain active during the period of exchanging signals, known as the quick tone exchange (QTE).

Figure 2:
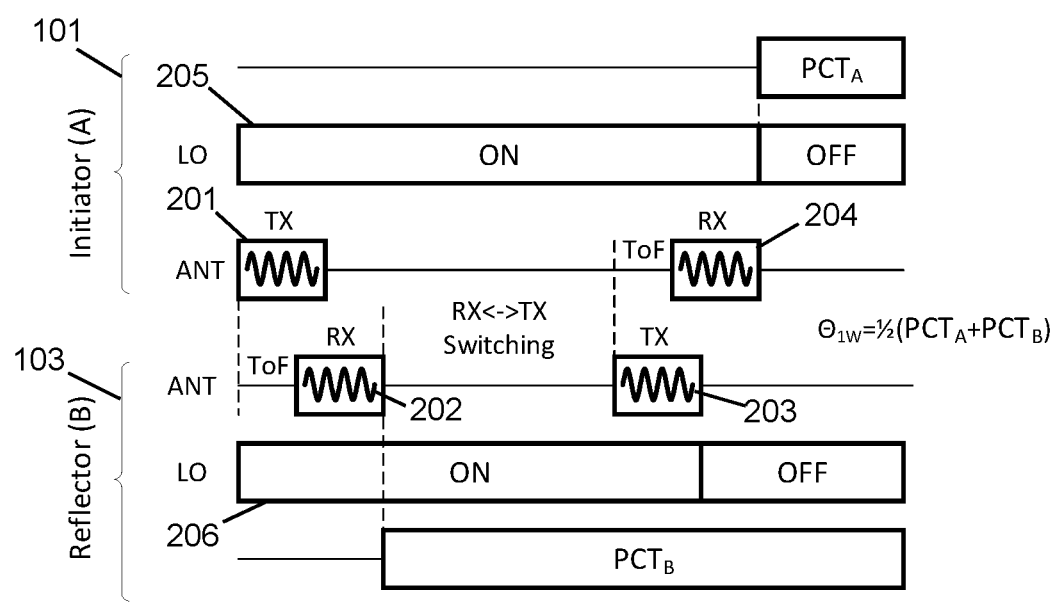
FIG. 2 is a schematic diagram illustrating a sequence of operations for an example phase measurement process.

FIG. 2 illustrates a sequence of operations according to the current QTE method for measuring distance using phase. The initiator LO 205 is switched on and a first CW signal 201 is transmitted. This signal 201 is received at the reflector after a first time of flight ToF. The initiator LO signal 205 is kept on after transmission to maintain phase coherence. The reflector 103 compares the received signal 202 with its own LO signal 206, based on which a first phase correction term $PCT_B$ is computed. After switching from receive (RX) to transmit (TX), the reflector 103 then transmits a second CW signal 203. This signal 203 is then received at the initiator 101 after a second ToF (which should, of course, equal the first ToF) and the initiator 101 compares the received signal 204 with its LO signal 205, based on which a second phase correction term $PCT_A$ is computed. The one-way carrier phase shift $\theta_{1W}$ can be calculated as the average of the two phase correction terms, i.e.:

$$\theta_{1w} = \frac{(PCT_A + PCT_B)}{2}$$

As the initiator LO signal 205 is kept active during at least the period from transmitting the first CW signal 201 to the end of the second received CW signal 204, the LO phase coherence guarantees a correct $PCT_A$ and thus a correct value for $\theta_{1W}$. This, however, comes at the expense of increased power usage.

Figure 3:
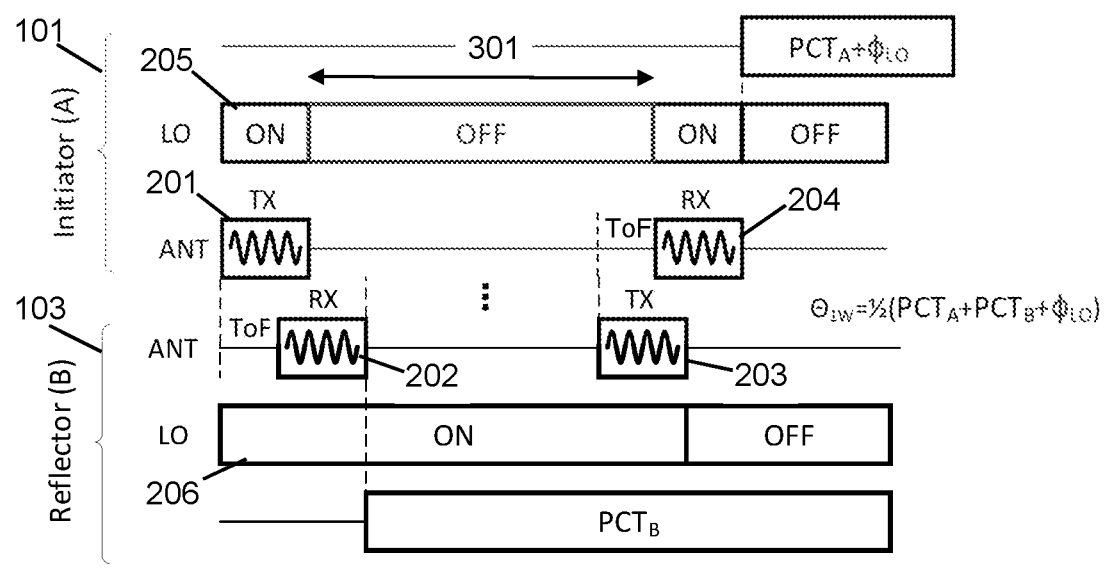
FIG. 3 is a schematic diagram illustrating a sequence of operations for a phase measurement process according to the present disclosure.

FIG. 3 illustrates a corresponding diagram showing a sequence of operations according to the present disclosure. In this, after transmission of the first CW signal 201 the LO signal 205 of the initiator 101 is turned off, and is turned back on after a time period 301 that is determined according to an expected time for the reflector 103 to switch from reception to transmission together with the ToF of the two transmitted signals 201, 203. When the initiator LO signal 205 is turned back on to receive the signal 204, the phase of the LO signal 205 will be random. This phase change $\phi_{LO}$, if determined or predetermined, may be used to correct the one-way carrier phase shift $\theta_{1W}$ as:

$$\theta_{1w} = \frac{(PCT_A + PCT_B + \phi_{LO})}{2}$$

Figure 4:
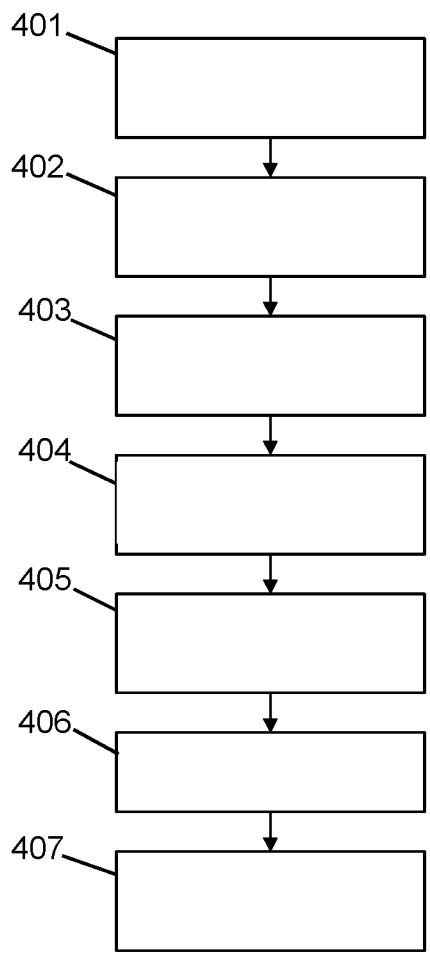
FIG. 4 is a flow diagram illustrating a sequence of operations performed by an initiator.

FIG. 4 is a flow diagram illustrating a sequence of operations involved in determining a distance between a first, or initiator, transceiver and a second, or reflector, transceiver. In a first step 401, the first transceiver activates a LO circuit and sends a first CW carrier signal 201. After transmission of the first CW carrier signal, the first transceiver deactivates the LO circuit (step 402) and waits for a time period 301 (step 403) before reactivating the LO circuit (step 403). The first transceiver then receives a second CW carrier signal transmitted by the second transceiver (step 405), following which a phase change is determined (step 406) and a one-way phase rotation calculated (step 407).

Figure 5:
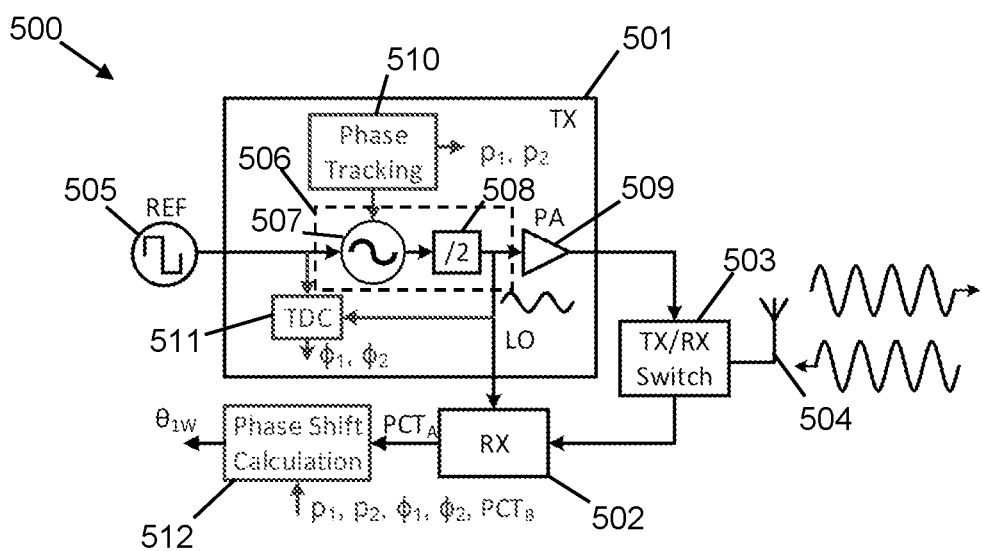
FIG. 5 is a schematic diagram of an example transceiver.

FIG. 5 is a schematic diagram of an example transceiver 500 configured for phase-based ranging. The transceiver 500 comprises a transmitter TX 501, a receiver RX 502 and a TX/RX switch 503 configured to selectively connect the transmitter 501 and receiver 502 to a common antenna 504 to allow the transceiver 500 to switch between transmitting and receiving signals via the antenna 504. A reference clock signal generator 505 provides a clock signal REF to the transmitter 501, from which a local oscillator signal LO is generated using a local oscillator 506. In this example, the local oscillator 506 comprises a fractional-N phase-locked loop (PLL) 507 and a frequency divider 508. The local oscillator signal LO is provided to a power amplifier PA 509 for transmission to the antenna 504 via the TX/RX switch 503, and to the receiver 502 for receiving signals from the antenna 504 via the switch 503.

When the PLL 507 is deactivated, or powered down, and then reactivated, or powered up again, the output phase of the LO signal will be arbitrary. In other words, the phase of the LO signal will be incoherent over a power recycle. This problem is solved by using a phase tracking module 510. The phase tracking module 510 digitally tracks the phase of the LO signal while the PLL 507 is powered down, and causes the PLL 507 to settle to the same phase value upon powering up again that it would have had without powering down. The phase tracking module 510 thereby maintains phase coherence of the LO signal over a power recycle.

The phase tracking module 510 may be implemented by using a multi-stage sigma-delta modulator, a first accumulator of which is kept running while the LO signal is deactivated. An additional integer counter is needed to track the LO phase. An example of a phase tracker for a phase locked loop is disclosed in U.S. Pat. No. 9,584,139. Divider-based PLLs typically use a multi-stage sigma-delta modulator (MASH) of order 3, meaning three stages are concatenated in series, each stage being a first-order MASH (=accumulator). An additional error cancellation network is implemented in the MASH. The first MASH stage (i.e., the first accumulator) is what determines the fractional phase of the PLL. Thus, if this first stage is kept running while all other blocks of the LO are deactivated, then, upon reactivating the LO, the LO phase will settle to the same value that it would have had without powering down.

While the output phase of the PLL 507, i.e. prior to the divider 508, remains coherent, the LO phase may still be uncertain because, upon powering up, the output of the divider 508 may be either 0° or 180°. This may be resolved by using a time-to-digital converter (TDC) 511, which receives the clock signal REF from the clock signal generator 505 and the local oscillator signal LO to provide measurements of the LO phase. The TDC 511 quantizes the time difference between an LO edge and a reference clock signal edge to determine the phase of the LO signal. A change in phase, i.e. a 180° change of the LO signal between powering down and powering up, can thereby be detected by comparing two measured phases $\phi_1$, $\phi_2$ taken at different times, i.e. before and after the time period 301 during which the local oscillator 506 is deactivated. An example TDC 511 may comprise a delay line comprising multiple delay elements connected in series, with a flip-flop at each delay element, as for example disclosed by Staszewski et al., in "1.3 V 20 ps Time-to-Digital Converter for Frequency Synthesis in 90-nm CMOS", IEEE Transactions on Circuits and Systems II: Express Briefs, Vol. 53, No. 3, March 2006, pp 220-224. An alternative way of detecting phase change in an LO signal is disclosed in WO 2019/066835 A1.

To calculate the one-way carrier phase shift $\theta_{1W}$, a phase shift calculation module 512 receives outputs from the TDC 511, phase tracking module 510 and receiver 502. A correction may be applied to the measured phase correction $PCT_B$ by applying a LO phase change $\phi_{LO}$, which may be obtained by comparing the phase difference $\phi_1-\phi_2$ measured by the TDC 511 and the expected digital phase difference $p_1-p_2$ (modulo $2\pi$) from the phase tracking module 510. For a frequency divider 508 configured to divide by 2, the LO phase change $\phi_{LO}$ is either 0 or 180°. In general, for a frequency divider configured to divide by N, the LO phase change will take a number of values determined by n*360°/N, where n=0, 1, 2, . . . N−1. In practice, common values for N may be 2, 4 or 8.

Figure 6:
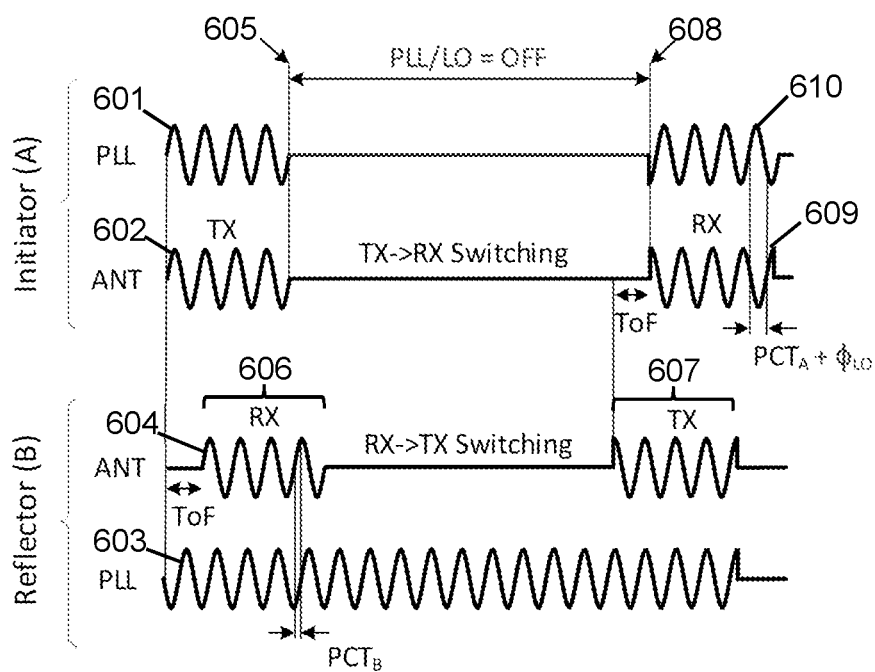
FIG. 6 is a schematic diagram illustrating signals transmitted and received between an initiator and a reflector.

A detailed signalling diagram of a sequence of operations at the initiator and reflector transceivers is illustrated in FIG. 6, showing signals 601, 602 at the initiator LO and antenna, and signals 603, 604 at the reflector LO and antenna. Phase tracking by the phase tracking module 510 starts as the initiator LO is deactivated (time 605), at which point the digital phase $p_1$ is determined and the LO phase Oi measured. After the first CW signal 606 is received by the reflector, the first phase correction $PCT_B$ is measured at the reflector by comparing the LO signal 603 with the received first CW signal 606. After a period for switching between receive (RX) and transmit (TX) modes, the reflector transmits a second CW signal 607, which is then received at the initiator. At or prior to receiving the second CW signal 607, the initial LO is reactivated (time 608), at which point the PLL phase $p_2$ is recovered and the LO phase $\phi_2$ measured. A second phase correction $PCT_A$ is then measured from a comparison between the received second CW signal 609, which is received by the initiator in a packet that also contains the first phase correction $PCT_B$, and the recovered LO signal 610 at the initiator. As described above, the LO phase change $\phi_{LO}$ is determined from the measured LO phases and PLL tracked phases, which is used to provide a correction to the second phase correction $PCT_A$. A one-way carrier phase shift is then determined from an average of the first and second phase corrections.

The carrier phase shift may be used to determine a distance between the initiator and reflector. At a single frequency, the phase shift may only determine the distance in terms of a fraction of a wavelength, but if measurements are taken at multiple frequencies an unambiguous measure of actual distance can be derived, as for example described in the above-mentioned Bluetooth DIPD.

An advantage of the above described approach is that power can be saved in the initiator device during QTE. For example, typical PLL LO circuits of a low energy Bluetooth transceiver may require around 10 mA. Assuming a typical use of 80 frequencies throughout the Bluetooth band (around 2.4 GHz) for QTE, with around 200 μs per tone, an overall time period of around 16 ms may be available for the LO of the initiator to be switched off, during which the 10 mA current may be saved. The time period during which the LO is deactivated may be slightly less than the time per tone, for example around 190 μs. In a general aspect therefore, the local oscillator of the first transceiver, or initiator, may be deactivated for up to around 190 μs between transmitting the first continuous wave carrier signal packet and receiving the second continuous wave carrier signal packet.

From reading the present disclosure, other variations and modifications will be apparent to the skilled person. Such variations and modifications may involve equivalent and other features which are already known in the art of radio transceivers, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality. A single processor or other unit may fulfil the functions of several means recited in the claims and reference signs in the claims shall not be construed as limiting the scope of the claims.

What is claimed is:

1. A method of determining a carrier phase shift between a first transceiver and a second transceiver, each transceiver comprising a local oscillator for generating a carrier signal, the method comprising:
    the first transceiver generating and transmitting a first continuous wave carrier signal packet;
    the second transceiver receiving the first continuous wave carrier signal packet;
    the second transceiver calculating a first phase correction based on a comparison between the received first continuous wave carrier signal packet and a local oscillator carrier signal at the second transceiver;
    the second transceiver generating and transmitting a second continuous wave carrier signal packet;
    the first transceiver receiving the second continuous wave carrier signal packet;
    the first transceiver calculating a second phase correction based on a comparison between the received second continuous wave carrier signal packet and a local oscillator signal at the first transceiver; and
    the first transceiver calculating the carrier phase shift from one half of a sum of the first phase correction, the second phase correction, and an integer phase change of the local oscillator signal at the first transceiver and calculating a distance between the first and second transceivers based on the carrier phase shift,
    wherein the integer phase change is caused by the local oscillator of the first transceiver being deactivated after transmitting the first continuous wave carrier signal packet and reactivated before receiving the second continuous wave carrier signal packet and the local oscillator of the second transceiver not being deactivated between a duration when the first continuous wave carrier signal packet is received and the second continuous wave carrier signal packet is transmitted; and
    wherein the integer phase change is a phase change of a divider by two of the local oscillator of the first transceiver, the integer phase change being only one of a 180 degrees phase change between when the local oscillator of the first transceiver is deactivated and reactivated and a 0 degree phase change between when the local oscillator of the first transceiver is deactivated and reactivated; and wherein the integer phase change is determined based on a comparison of an expected digital phase difference of the local oscillator signal when the local oscillator of the first transceiver is deactivated and reactivated and a measured phase difference of the local oscillator signal when the local oscillator of the first transceiver is deactivated and reactivated.

2. The method of claim 1, wherein a phase tracking module in the first transceiver maintains phase coherence of the local oscillator when reactivated.

3. The method of claim 2 wherein the phase tracking module tracks the phase of the local oscillator before the local oscillator is deactivated, determines a phase value upon deactivation and causes the local oscillator to settle to a phase value dependent on the determined phase value after the local oscillator is reactivated.

4. The method of claim 3 wherein the first transceiver comprises a time to digital converter configured to provide a measure of phase difference between a reference clock signal and the local oscillator signal after reactivation, the second phase correction including the measured phase difference.

5. The method of claim 1 wherein the local oscillator of the first transceiver is deactivated for up to 190 μs between transmitting the first continuous wave carrier signal packet and receiving the second continuous wave carrier signal packet.

6. The method of claim 1 wherein the first and second transceivers are configured to operate as Bluetooth transceivers, operating at a frequency range of between 2.4 and 2.4835 GHz.

7. A method of determining a distance between first and second transceivers, comprising:
    performing the method according to claim 1 with the first and second continuous wave carrier signal packets at a plurality of different frequencies; and
    calculating the distance between the first and second transceivers from carrier phase shifts determined at each of the plurality of different frequencies.

8. A first transceiver comprising:
    a transmitter;
    a receiver;

a switch arranged to selectively switch the transceiver between transmitting and receiving signals via a common antenna;

a reference clock signal generator;

a local oscillator configured to generate a carrier signal from a clock signal provided by the reference clock signal generator; and a phase tracking module arranged to maintain phase coherence of the local oscillator upon reactivating the local oscillator after deactivation, wherein the first transceiver is configured to determine a carrier phase shift of signals sent between the first transceiver and a second transceiver by the sequential steps of:

i) generating and transmitting a first continuous wave carrier signal packet;

ii) deactivating the local oscillator;

iii) reactivating the local oscillator;

iv) receiving a second continuous wave carrier signal packet transmitted by the second transceiver;

v) calculating a second phase correction based on a comparison between the received second continuous wave carrier signal packet and a local oscillator signal at the first transceiver; and vi) receiving a first phase correction from the second transceiver based on a comparison between the first continuous wave carrier signal packet and a local oscillator carrier signal at the second transceiver;

vii) calculating the carrier phase shift from one half of a sum of the first phase correction, the second phase correction, and an integer phase change of the local oscillator signal at the first transceiver and;

viii) calculating a distance between the first and second transceivers based on the carrier phase shift, wherein the integer phase change is caused by the local oscillator of the first transceiver being deactivated after transmitting the first continuous wave carrier signal packet and reactivated before receiving the second continuous wave carrier signal packet and the local oscillator of the second transceiver not being deactivated between a duration when the first continuous wave carrier signal packet is received and the second continuous wave carrier signal packet is transmitted; and wherein the integer phase change is a phase change of a divider by two of the local oscillator of the first transceiver, the integer phase change being only one of a 180 degrees phase change between when the local oscillator of the first transceiver is deactivated and reactivated and a 0 degree phase change between when the local oscillator of the first transceiver is deactivated and reactivated; and wherein the integer phase change is determined based on a comparison of an expected digital phase difference of the local oscillator signal when the local oscillator of the first transceiver is deactivated and reactivated and a measured phase difference of the local oscillator signal when the local oscillator of the first transceiver is deactivated and reactivated.

9. The first transceiver of claim 8, wherein the phase tracking module is configured to track the phase of the local oscillator signal before the local oscillator is deactivated, determine a phase value upon deactivation and cause the local oscillator to settle to a phase value dependent on the determined phase value after the local oscillator is reactivated.

10. The first transceiver of claim 8 wherein the first transceiver comprises a time to digital converter configured to provide a measure of phase difference between a reference clock signal and the local oscillator signal after reactivation of the local oscillator, the second phase correction including the measured phase difference.

\* \* \* \* \*